(12) United States Patent
Ohira et al.

(10) Patent No.: US 9,384,415 B2
(45) Date of Patent: Jul. 5, 2016

(54) IMAGE PROCESSING APPARATUS AND METHOD, AND COMPUTER PROGRAM PRODUCT

(71) Applicant: KABUSHIKI KAISHA TOSHIBA, Tokyo (JP)

(72) Inventors: Hidetaka Ohira, Kanagawa (JP); Yusuke Tazoe, Tokyo (JP); Masahiro Sekine, Tokyo (JP); Masashi Nishiyama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 49 days.

(21) Appl. No.: 14/451,526

(22) Filed: Aug. 5, 2014

(65) Prior Publication Data

US 2015/0036932 A1 Feb. 5, 2015

(30) Foreign Application Priority Data

Aug. 5, 2013 (JP) .................................. 2013-162552

(51) Int. Cl.
*G06K 9/46* (2006.01)

(52) U.S. Cl.
CPC ...................................... *G06K 9/468* (2013.01)

(58) Field of Classification Search
None
See application file for complete search history.

(56) References Cited

U.S. PATENT DOCUMENTS

| 4,769,850 | A | * | 9/1988 | Itoh | G06K 9/4609 |
| | | | | | 382/132 |
| 5,991,456 | A | | 11/1999 | Rahman et al. | |
| 2010/0287511 | A1 | | 11/2010 | Meier et al. | |
| 2011/0255781 | A1 | * | 10/2011 | Hamsici | G06K 9/4671 |
| | | | | | 382/170 |
| 2013/0011030 | A1 | * | 1/2013 | Tzoumas | G06T 7/0044 |
| | | | | | 382/128 |
| 2013/0223683 | A1 | * | 8/2013 | Jiang | G06K 9/4638 |
| | | | | | 382/103 |
| 2013/0287251 | A1 | * | 10/2013 | Mitsui | G06K 9/6267 |
| | | | | | 382/103 |
| 2014/0286530 | A1 | | 9/2014 | Ohira et al. | |

FOREIGN PATENT DOCUMENTS

| JP | H08-329397 | 12/1996 |
| JP | 2010-541053 | 12/2010 |
| JP | 2013-060718 | 4/2013 |
| JP | 2014-048966 | 3/2014 |
| JP | 2014-186520 | 10/2014 |

* cited by examiner

*Primary Examiner* — David F Dunphy
(74) *Attorney, Agent, or Firm* — Nixon & Vanderhye, P.C.

(57) ABSTRACT

According to an embodiment, an image processing apparatus includes an obtainer, a setter, a first calculator, a second calculator, and a third calculator. The obtainer obtains an image. The setter sets a plurality of first regions and a plurality of second regions on the image. Each of the first regions and the second regions includes two or more pixels, and at least one of the second regions is different in position or size from the first regions. The first calculator calculates first feature data representing an image feature of the first regions. The second calculator calculates second feature data which is a luminance gradient between the second regions. The third calculator calculates relative feature data representing a relative relationship between the first feature data and the second feature data.

14 Claims, 10 Drawing Sheets

IMAGE PROCESSING APPARATUS AND METHOD, AND COMPUTER PROGRAM PRODUCT

CROSS-REFERENCE TO RELATED APPLICATION(S)

This application is based upon and claims the benefit of priority from Japanese Patent Application No. 2013-162552, filed on Aug. 5, 2013; the entire contents of which are incorporated herein by reference.

FIELD

An embodiment described herein relate generally to an image processing apparatus and method, and a computer program product.

BACKGROUND

As a technique for achieving augmented reality using image recognition technology, a technique using markers is known. However, there is a problem that mechanical-looking markers ruin designs. To solve this problem, there is known a technique in which no marker is used and a target object is identified using a local feature value robust against changes in the state of the target object (rotation of the target object or a change in distance).

However, in the conventional art, there is a problem that recognition accuracy significantly decreases when a shadow or shininess occurs on a target object due to the influence of illumination, etc.

DETAILED DESCRIPTION

Figure 1:
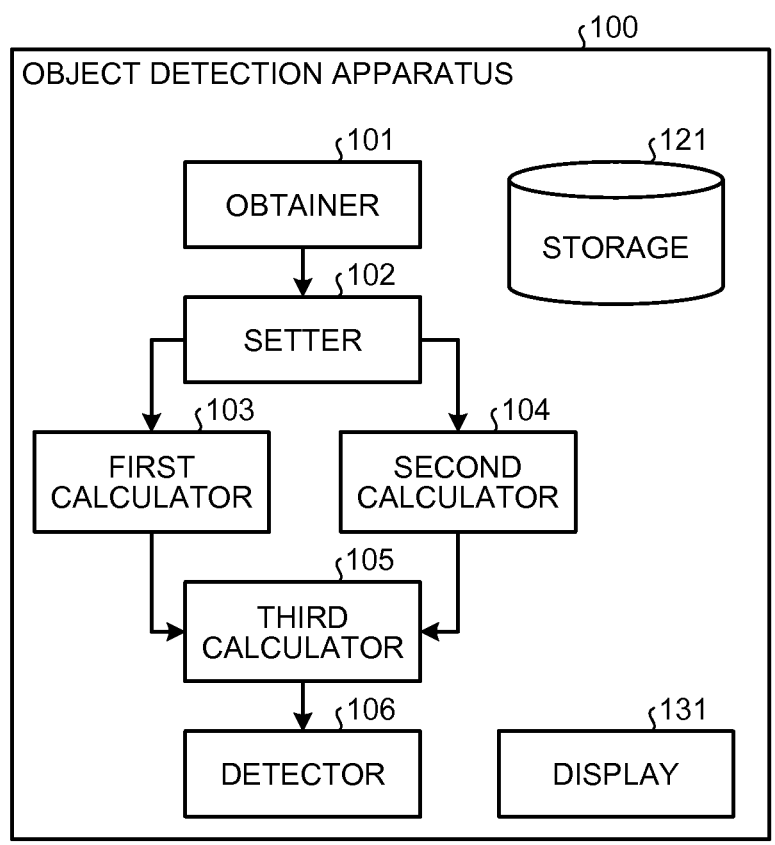
FIG. 1 is a block diagram of an object detection apparatus of the present embodiment.

According to an embodiment, an image processing apparatus includes an obtainer, a setter, a first calculator, a second calculator, and a third calculator. The obtainer obtains an image. The setter sets a plurality of first regions and a plurality of second regions on the image. Each of the first regions and the second regions includes two or more pixels, and at least one of the second regions is different in position or size from the first regions. The first calculator calculates first feature data representing an image feature of the first regions. The second calculator calculates second feature data which is a luminance gradient between the second regions. The third calculator calculates relative feature data representing a relative relationship between the first feature data and the second feature data.

With reference to the accompanying drawings, a preferred embodiment of an image processing apparatus will be described in detail below.

For a problem of a reduction in recognition accuracy caused by the influence of illumination, etc., there is proposed a technique for achieving high recognition accuracy by enhancing luminance gradients which are factors for feature value calculation. However, this technique utilizes the fact that the shape and properties of a target object are known to a certain extent. Thus, if the shape, etc., of the target object are unknown, then the technique cannot be applied. In addition to this, a method is also considered in which, as a pre-process, luminance values are normalized using a filter and thereafter luminance gradients are calculated. However, with this method, the amount of computation becomes excessively large, and accordingly, it is difficult to apply the method to portable terminals with low computation performance, etc.

An image processing apparatus according to the present embodiment removes the influence of illumination using a relative relationship between a plurality of feature data (luminance gradients, etc.) which are calculated from a plurality of regions with different positions or different sizes. For example, when illumination exerts equal influence on two luminance gradients, feature data with no influence of illumination can be calculated by using the difference or ratio between the two luminance gradients. Since feature data that is not influenced by illumination such as shadows and shininess can be calculated, image recognition (object recognition) robust against illumination changes becomes possible. Note that the feature data is data representing an image feature. The feature data may be a scalar (feature value) or a vector (feature vector).

In the following, an example will be described in which an image processing apparatus is implemented as an object detection apparatus that detects an object from an image by image recognition. An applicable apparatus is not limited to an object detection apparatus. For example, an image processing apparatus may be implemented as an apparatus that does not have the function of detecting an object and performs up to extraction of feature data used for object detection, etc.

FIG. 1 is a block diagram illustrating an exemplary functional configuration of an object detection apparatus 100 of the present embodiment. The object detection apparatus 100 includes a storage 121, a display 131, an obtainer 101, a setter 102, a first calculator 103, a second calculator 104, a third calculator 105, and a detector 106.

The storage 121 stores therein information to be referred to in various processes. For example, the storage 121 stores therein information identifying a predetermined, registered object and feature data obtained from an image of the registered object, such that the information and the feature data are associated with each other. The detector 106, which will be described later, checks the feature data stored in the storage 121 against the feature data of a subject obtained from a captured image, and thereby detects a registered object that matches the subject. Note that the storage 121 can be composed of generally used various storage media such as an HDD (Hard Disk Drive), an optical disk, a memory card, and a RAM (Random Access Memory).

The display 131 is used to display various types of information, and can be implemented by a display apparatus, e.g., a liquid crystal display or a touch panel display.

The obtainer 101 obtains an image where a subject is captured. The obtainer 101 can be configured, for example, to obtain an image captured by a camera when the object detection apparatus 100 is equipped with an image-capturing unit (camera). The obtainer 101 may be configured to obtain an image from an apparatus external to the object detection apparatus 100.

The setter 102 sets regions on the obtained image. For example, the setter 102 sets a plurality of first regions and a plurality of second regions different in position or size from the first regions, on the obtained image. Each of the first regions and the second regions is a region including two or more pixels. It is sufficient that at least one of the plurality of second regions be different in position or size from at least one of the plurality of first regions. Exemplary arrangements of the first regions and the second regions will be described later.

The first calculator 103 calculates feature data (first feature data) representing an image feature of the plurality of first regions. The second calculator 104 calculates feature data (second feature data) representing an image feature of the plurality of second regions. At least one of the first feature data and the second feature data represents a luminance gradient between regions. In the following, description is made assuming that mainly the second feature data represents a luminance gradient. When the first feature data represents a luminance gradient, and the second feature data represents a feature other than a luminance gradient, the following technique is applied such that the first feature data and the second feature data are interchanged with each other.

A luminance gradient between regions can be calculated by, for example, methods such as those shown below.
  A weighted sum of the luminance averages of the respective regions
  A value obtained by multiplying the luminance averages of the respective regions, using weights
  A weighted sum of the luminance totals of the respective regions
  A value obtained by multiplying the luminance totals of the respective regions, using weights A specific example of the luminance gradient will be further described. The luminance gradient may be calculated by any method as long as the luminance gradient is data representing the difference in luminance between at least two regions among a plurality of regions. For example, the direction of the luminance gradient is calculated by the following equations (1) to (3). In addition, the strength of the luminance gradient is calculated by the following equation (4):

$$V(x) = \sum_{i}^{U_V(x)} a_i L_x(i)$$

$$H(x) = \sum_{i}^{U_H(x)} a_i L_x(i)$$

$$\theta(x) = \tan^{-1}\left(\frac{V(x)}{H(x)}\right)$$

$$m(x) = \sqrt{V(x)^2 + H(x)^2}$$

A luminance value $L_x(i)$ ($i=1, \ldots, n$) is the luminance value of each of n regions for a sampling point at a coordinate x. $V(x)$ and $H(x)$ are the directions of luminance gradients in the vertical direction and the horizontal direction, respectively, and $a_i$ is the weight of an i-th region. $U_V(x)$ is the set of regions used when the luminance gradient in the vertical direction is calculated. $U_H(x)$ is the set of regions used when the luminance gradient in the horizontal direction is calculated. $U_V(x)$ and $U_H(x)$ may coincide with each other. $\theta(x)$ is the direction of a luminance gradient at the sampling point x, and $m(x)$ is the strength of the luminance gradient at the sampling point x.

The luminance value of a region refers to a weighted sum of the luminance values of the pixels in the region or a weighted average of the luminance values of the pixels in the region. The weight of the luminance value may be fixed, or may be determined using a Gaussian filter, etc., or may be set to any value. When the region is rectangular, its luminance average can be calculated rapidly using an integral image.

To calculate a luminance gradient, at least two regions are set. For example, to calculate a luminance gradient in the vertical direction, two regions arranged side by side in the vertical direction are set. To calculate a luminance gradient in the horizontal direction, two regions arranged side by side in the horizontal direction are set.

Feature data other than a luminance gradient can be calculated by, for example, methods such as those shown below.
  A total sum of the luminance averages of the respective regions
  A value obtained by multiplying the luminance averages of the respective regions
  A total sum of the luminance totals of the respective regions
  A value obtained by multiplying the luminance totals of the respective regions The third calculator 105 calculates relative feature data representing a relative relationship between the first feature data and the second feature data. For example, the third calculator 105 calculates relative feature data which is the difference between the first feature data and the second feature data, or relative feature data which is the ratio between the first feature data and the second feature data.

When both of the first feature data and the second feature data are luminance gradients, by taking a difference therebetween, relative feature data where the influence of shadows or shininess on the directions of luminance gradients is cancelled out can be obtained.

When the ratio between the first feature data and the second feature data is used as relative feature data, the influence of shadows or shininess on the strengths of luminance gradients (contrast) can be suppressed. In this case, one of the first feature data and the second feature data may be feature data other than a luminance gradient.

The third calculator 105 may calculate relative feature data using combination of the difference and ratio between the first feature data and the second feature data. By this, relative feature data where the influence of shadows or shininess on both of the directions and strengths of luminance gradients is suppressed can be calculated. For example, the third calculator 105 may calculate relative feature data which is the ratio between the difference between the first feature data and the second feature data, and the difference between third feature data and the second feature data.

The third feature data is data representing an image feature of a plurality of third regions. The third regions are regions different in position or size from the first and second regions, and are set by, for example, the setter 102. In this case, for example, the second calculator 104 (which may be the first calculator 103) is configured to calculate third feature data representing an image feature of the third regions.

The detector 106 compares the calculated relative feature data with the feature data of registered objects stored in the storage 121, to identify (detect) a registered object having feature data similar to or matching the calculated relative feature data, as a registered object corresponding to the subject. The feature data of registered objects is calculated beforehand by the same technique as that used by the third calculator 105. The detector 106 may calculate a similarity between feature data by the SSD (Sum of Squared Difference), the SAD (Sum of Absolute Difference), normalized cross-correction, and the like. In addition, the detector 106 may be configured to detect a registered object corresponding to the subject by an identifier such as an SVM (Support Vector Machine).

The obtainer 101, the setter 102, the first calculator 103, the second calculator 104, the third calculator 105, and the detector 106 may be implemented, for example, by allowing a processing apparatus such as a CPU (Central Processing Unit) to execute a program, i.e., by software, or may be implemented by hardware such as an IC (Integrated Circuit), or may be implemented by using both of software and hardware.

Figure 2:
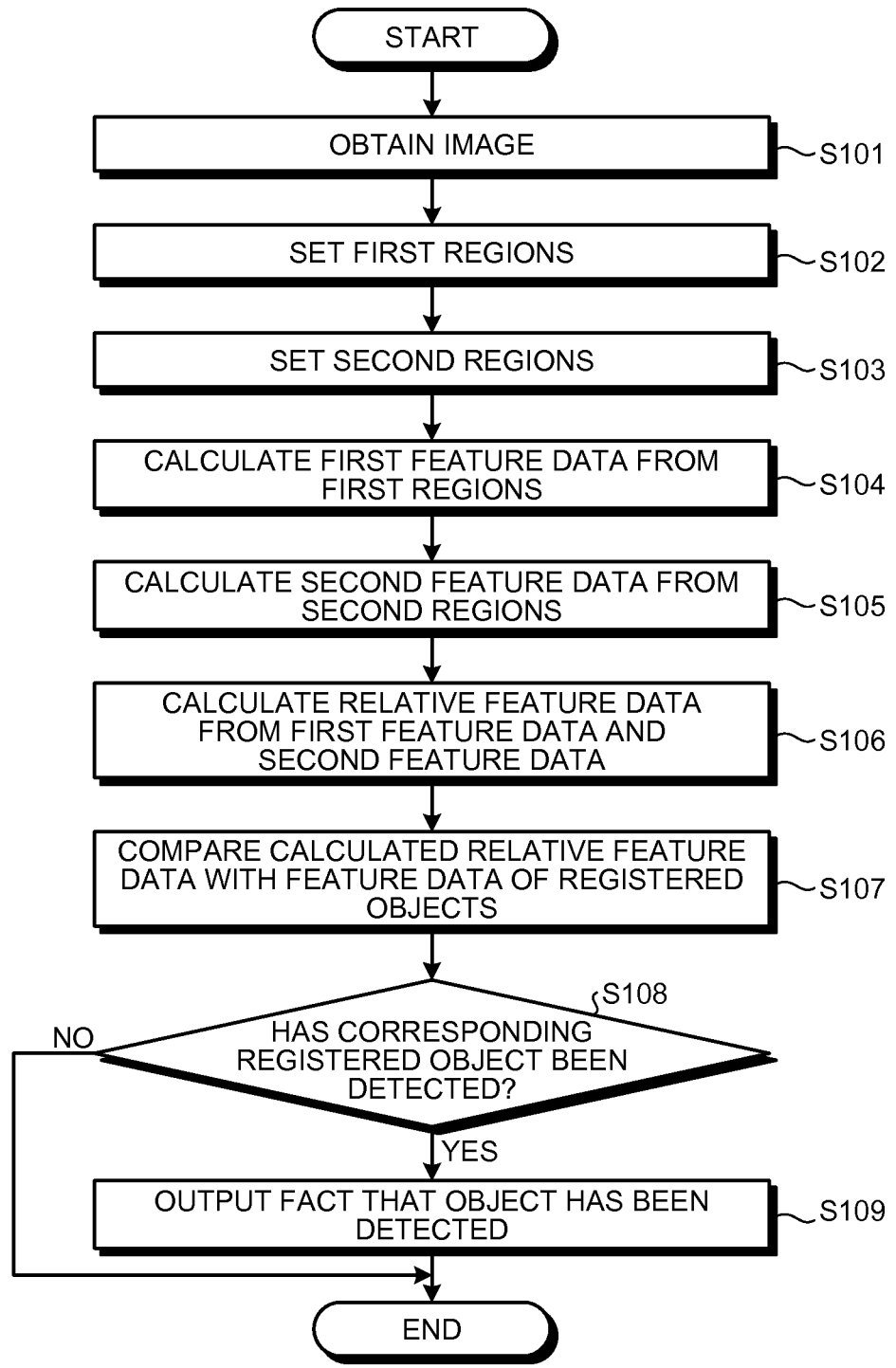
FIG. 2 is a flowchart of an object detection process of the present embodiment.

Next, an object detection process performed by the object detection apparatus 100 according to the present embodiment which is configured in the above-described manner will be described using FIG. 2. FIG. 2 is a flowchart illustrating an example of an object detection process of the present embodiment.

The obtainer 101 obtains an image captured by, for example, a camera (step S101). The setter 102 sets first regions within the obtained image (step S102). The setter 102 sets second regions within the obtained image (step S103). In the case of using feature data of three types of regions, the setter 102 may further set third regions within the image.

The first calculator 103 calculates first feature data from the first regions (step S104). The second calculator 104 calculates second feature data from the second regions (step S105). The third calculator 105 calculates relative feature data from the first feature data and the second feature data (step S106).

The detector 106 compares the calculated relative feature data with the feature data of registered objects stored in the storage 121 (step S107). The detector 106 determines whether a corresponding registered object, i.e., a registered object whose feature data is similar to or matches the relative feature data, has been detected (step S108). If detected (step S108: Yes), the detector 106 outputs the fact that an object has been detected (step S109), and ends the object detection process. If a corresponding registered object has not been detected (step S108: No), the detector 106 ends the object detection process.

The fact that an object has been detected may be outputted to an external apparatus through a communication unit (not illustrated), etc., or may be outputted (displayed) to the display 131. The detector 106 may display content according to the detection result on the display 131. For example, the detector 106 may stream video according to the detection result to the display 131, or may display a website according to the detection result on the display 131. By this, an identification result can be fed back to a user. When it takes time to perform video streaming or display of a website, an animation showing that an object has been recognized (detected) may be displayed on the display 131. By this, whether an object has been recognized can be promptly fed back to the user.

Next, examples of the shape and arrangement of regions (first regions, second regions, etc.) from which feature data is calculated will be described. FIGS. 3 to 8 are diagrams for describing examples of the shape and arrangement of regions.

Figure 3:
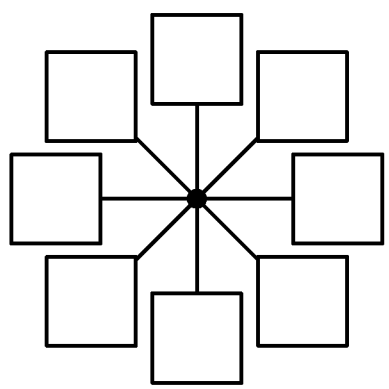
FIG. 3 is a diagram for describing an example of the shape and arrangement of regions.

FIG. 3 illustrates an example in which a plurality of regions is rectangular and arranged on the circumference of a circle with a reference point (a sampling point, etc.) at the center. Note that the shape of each region is any shape and may be polygonal shapes (an octagonal shape, etc.), circular shapes (including an oval shape), etc., in addition to rectangular shapes (a square and a rectangle).

Figure 4:
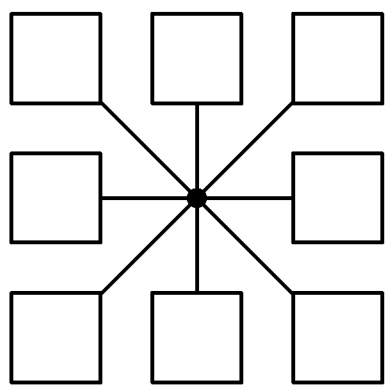
FIG. 4 is a diagram for describing an example of the shape and arrangement of regions.
Figure 5:
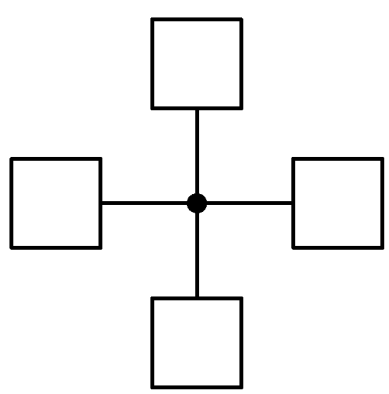
FIG. 5 is a diagram for describing an example of the shape and arrangement of regions.
Figure 6:
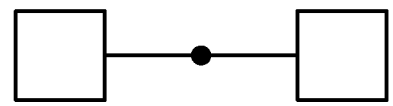
FIG. 6 is a diagram for describing an example of the shape and arrangement of regions.
Figure 7:
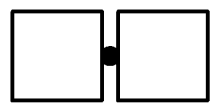
FIG. 7 is a diagram for describing an example of the shape and arrangement of regions.

FIG. 4 illustrates an example in which regions are arranged on the perimeter of a rectangle with a reference point at the center. FIG. 5 illustrates an example in which regions are arranged on the perimeter of a rhombus with a reference point at the center. FIG. 6 illustrates an example in which regions are arranged on a straight line passing through a reference point. FIG. 7 illustrates an example in which regions are arranged adjacent to each other.

Figure 8:
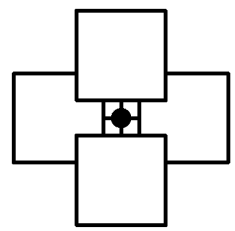
FIG. 8 is a diagram for describing an example of the shape and arrangement of regions.

FIG. 8 illustrates an example in which regions are arranged so as to partly overlap each other. FIG. 8 is an example in which the regions are arranged on the perimeter of a rhombus as in FIG. 5, and are arranged so as to overlap each other. Regions may be arranged according to the examples of FIGS. 3, 4, and 6, etc., and may be arranged so as to overlap each other.

Next, examples of relationships between the positions and sizes of first regions and second regions (or third regions) will be described. FIGS. 9 to 18 are diagrams for describing examples of relationships between the positions and sizes of first regions and second regions. In each drawing, a non-hatched region represents a first region, and a hatched region represents a second region. The configuration may be such that reversely a hatched region represents a first region, and a non-hatched region represents a second region.

Figure 9:
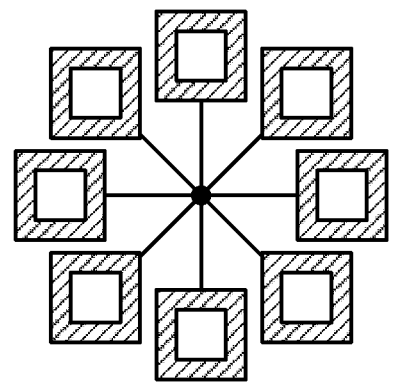
FIG. 9 is a diagram for describing relationships between the positions and sizes of first regions and second regions.

FIG. 9 illustrates an example in which first regions and second regions are arranged on the circumference of the same circle. FIG. 9 illustrates an example in which the size of each rectangular region included in the second regions is larger than that of each rectangular region included in the first regions. Note that FIG. 9 shows that the first regions are superimposed on the second regions. It is not necessary that the center of the first region and the center of the second region coincide with each other. In addition, the first regions and the second regions may be arranged so as to partly overlap each other as illustrated in FIG. 9, or may be arranged so as not to overlap each other.

FIG. 9 is an example in which the regions are arranged on the circumference of the same circle; however, the first regions and the second regions may be arranged on the circumferences of two concentric circles, respectively.

Figure 10:
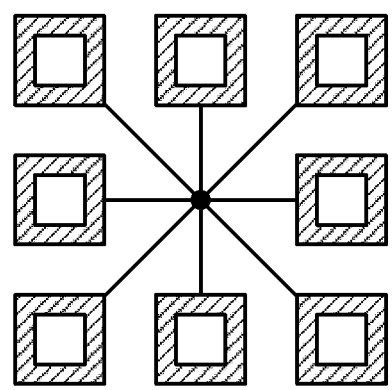
FIG. 10 is a diagram for describing relationships between the positions and sizes of first regions and second regions.

FIG. 10 illustrates an example in which first regions and second regions are arranged on the perimeter of a rectangle sharing the center. FIG. 10 is an example in which the regions are arranged on the perimeter of the same rectangle; however, the first regions and the second regions may be arranged on the perimeters of two different rectangles sharing the center, respectively.

Figure 11:
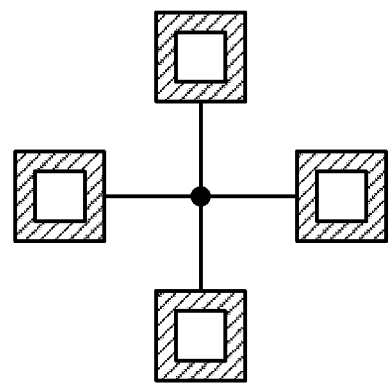
FIG. 11 is a diagram for describing relationships between the positions and sizes of first regions and second regions.

FIG. 11 illustrates an example in which first regions and second regions are arranged on the perimeter of a rhombus sharing the center. FIG. 11 is an example in which the regions are arranged on the perimeter of the same rhombus; however, the first regions and the second regions may be arranged on the perimeters of two different rhombuses sharing the center, respectively.

Figure 12:
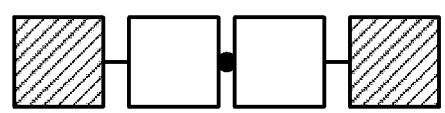
FIG. 12 is a diagram for describing relationships between the positions and sizes of first regions and second regions.

FIG. 12 illustrates an example in which first regions and second regions are arranged on the same straight line. The direction of the straight line is not limited to a horizontal direction and can be any direction.

Figure 13:
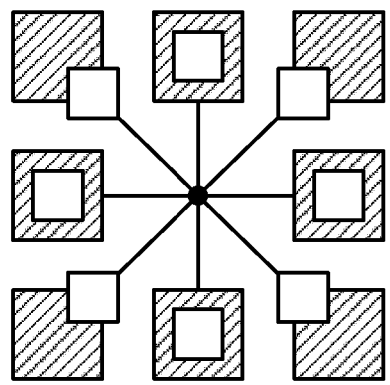
FIG. 13 is a diagram for describing relationships between the positions and sizes of first regions and second regions.

FIG. 13 illustrates an example in which first regions and second regions are arranged on the perimeters of shapes that share the center but differ from each other. FIG. 13 illustrates an example in which the first regions are arranged on the circumference of a circle, and the second regions are arranged on the perimeter of a rectangle. A combination of shapes that differ from each other is not limited thereto, and any combination can be applied.

Figure 14:
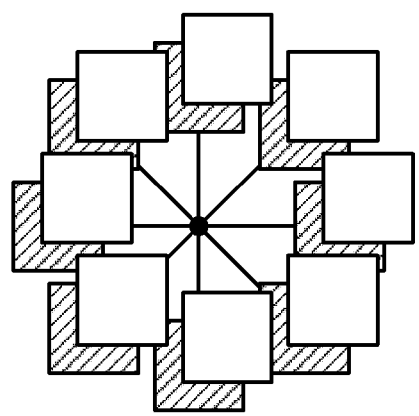
FIG. 14 is a diagram for describing relationships between the positions and sizes of first regions and second regions.
Figure 15:
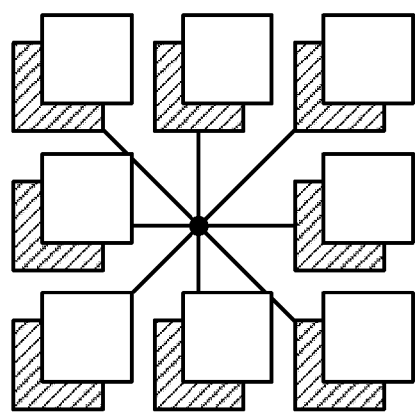
FIG. 15 is a diagram for describing relationships between the positions and sizes of first regions and second regions.
Figure 16:
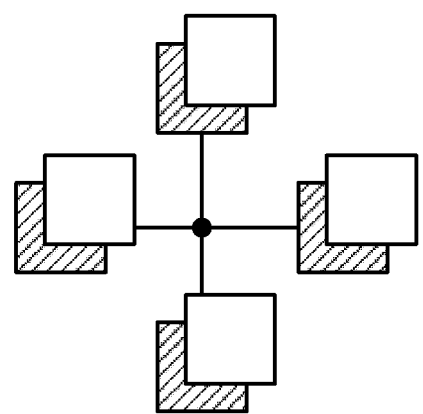
FIG. 16 is a diagram for describing relationships between the positions and sizes of first regions and second regions.

FIG. 14 illustrates an example in which first regions and second regions are arranged on the circumferences of two circles not sharing the center, respectively. FIG. 15 illustrates an example in which first regions and second regions are arranged on the perimeters of two rectangles not sharing the center. FIG. 16 illustrates an example in which first regions and second regions are arranged on the perimeters of two rhombuses not sharing the center. In FIGS. 14 to 16, the direction in which the centers of two shapes are shifted with respect to each other is not limited to those illustrated in the drawings.

Figure 17:
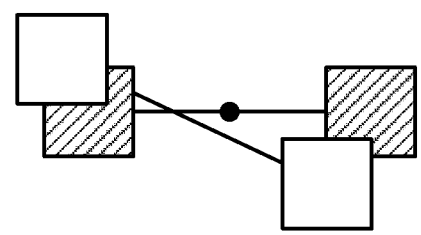
FIG. 17 is a diagram for describing relationships between the positions and sizes of first regions and second regions.
Figure 18:
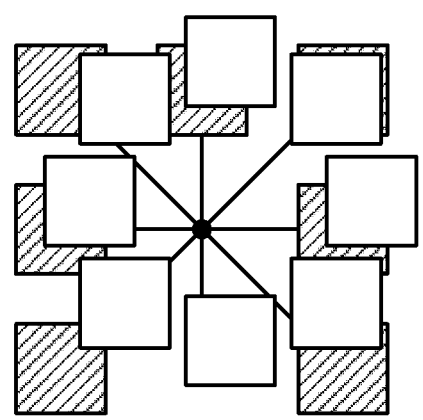
FIG. 18 is a diagram for describing relationships between the positions and sizes of first regions and second regions.

FIG. 17 illustrates an example in which first regions and second regions are arranged on two different straight lines, respectively. FIG. 18 illustrates an example in which first regions and second regions are arranged on the perimeters of shapes not sharing the center and differing from each other.

For the shape of the first regions, the shape of the second regions, a positional relationship between the first regions and the second regions, and a size relationship between the first regions and the second regions, optimal ones may be selected according to how an application is used or to the shape of a target object.

For example, when the regions are arranged circularly as illustrated in FIG. 3, luminance gradients in any direction can be uniformly calculated. When the regions are arranged on the perimeter of a rectangle as illustrated in FIG. 4, a luminance gradient in a vertical direction and a luminance gradient in a horizontal direction can be calculated with a high accuracy. When the regions are arranged on the perimeter of a rhombus as illustrated in FIG. 5, a luminance gradient in a vertical direction and a luminance gradient in a horizontal direction can be calculated rapidly. When the regions are arranged linearly or adjacent to each other as illustrated in FIGS. 6 and 7, a luminance gradient in a certain direction can be calculated rapidly.

Figure 19:
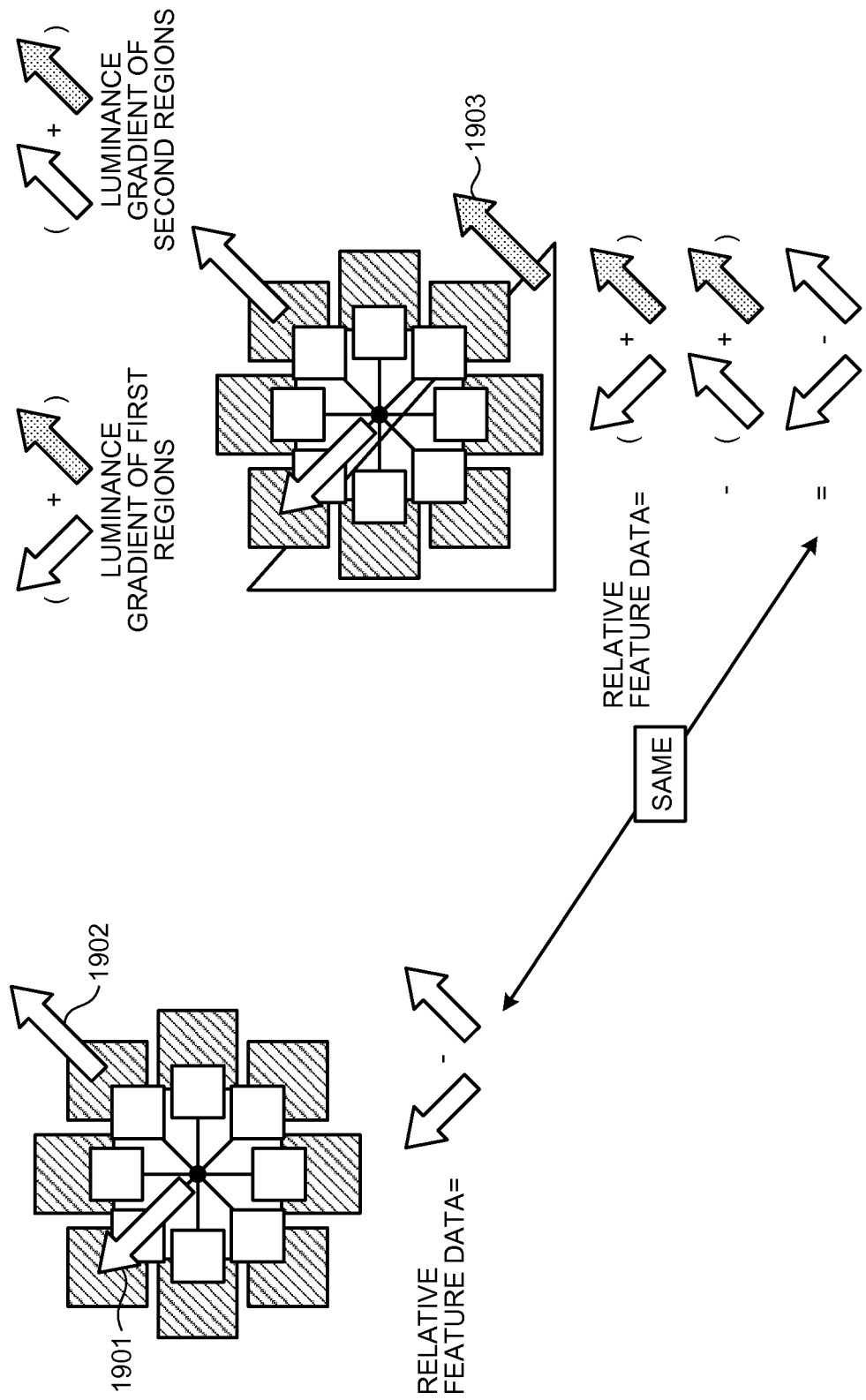
FIG. 19 is a diagram describing an example in which the difference between two feature data is used as feature data.

When relative feature data is, for example, a value calculated using the difference between first feature data and second feature data, feature data with no influence of shadows or shininess on the directions of luminance gradients can be obtained. FIG. 19 is a diagram describing an example in which the difference between two feature data is used as feature data (relative feature data). FIG. 19 illustrates an example of the case in which both of two feature data are luminance gradients.

The left part of FIG. 19 illustrates an example of relative feature data calculated when there is no influence of shadows or shininess. The relative feature data is represented by the difference between first feature data 1901 and second feature data 1902.

The right part of FIG. 19 illustrates an example of relative feature data calculated when there is an influence of shadows or shininess. In this case, feature data 1903 resulting from the influence of shadows or shininess is added to each of a luminance gradient of first regions and a luminance gradient of second regions. The relative feature data is the difference between the luminance gradient of the first regions and the luminance gradient of the second regions. Hence, by taking a difference between the gradients, the feature data 1903 is cancelled out, and accordingly, the same relative feature data as that in the left part of FIG. 19 is calculated.

When the relative feature data is, for example, a value calculated using the ratio between the first feature data and the second feature data, feature data with no influence of shadows or shininess on the strengths of luminance gradients can be obtained.

When the relative feature data is, for example, a value calculated by using a combination of the difference and ratio between the first feature data and the second feature data, feature data with no influence of shadows or shininess on the directions of luminance gradients and with no influence of shadows or shininess on the strengths of luminance gradients can be obtained.

Figure 20:
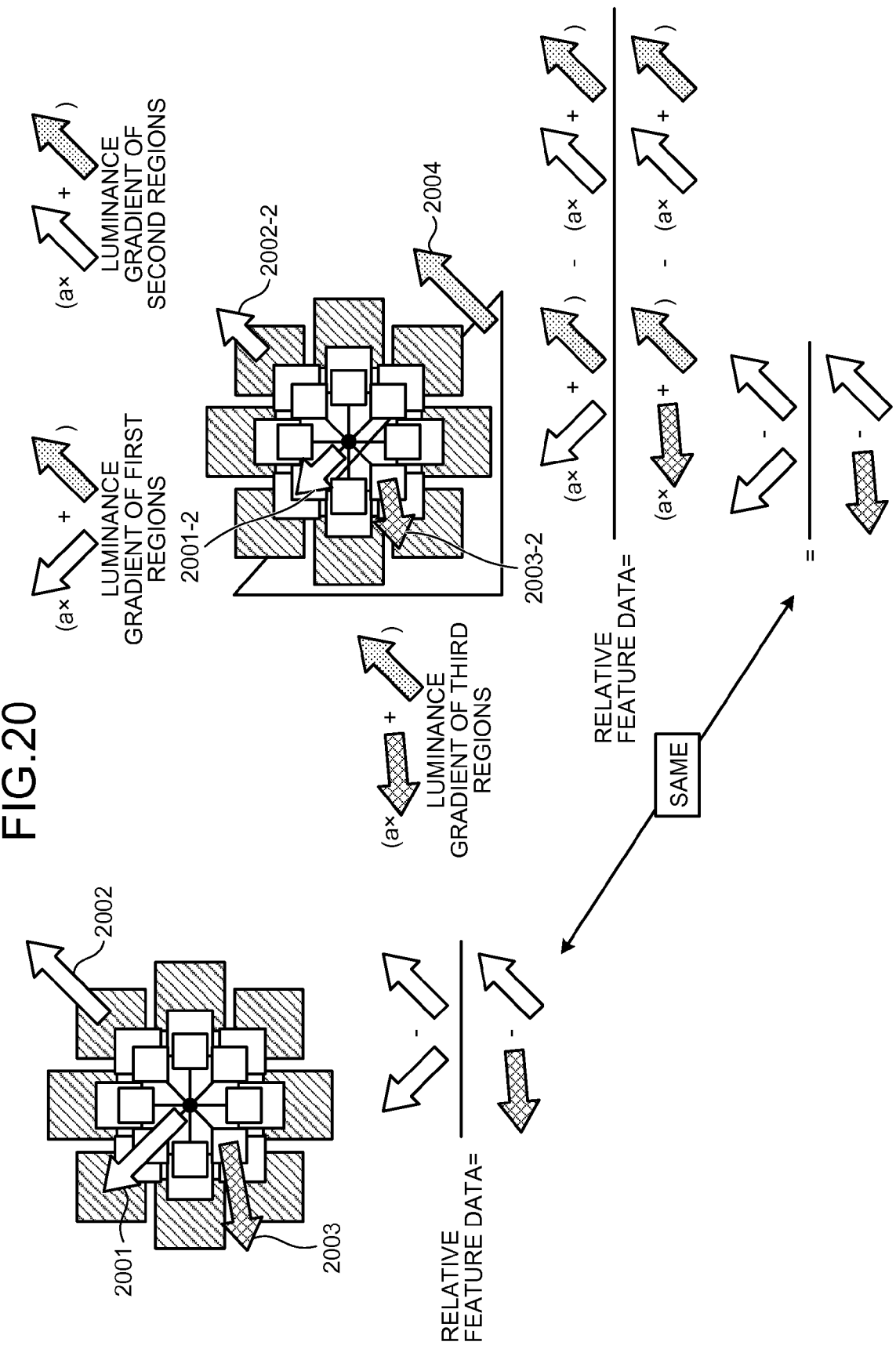
FIG. 20 is a diagram describing an example in which the ratio between differences between two feature data is used as feature data.

FIG. 20 is a diagram describing an example in which a plurality of differences between two feature data is obtained and the ratio between the plurality of differences is used as feature data (relative feature data). FIG. 20 illustrates an example of the case in which both of two feature data are luminance gradients.

The left part of FIG. 20 illustrates an example of relative feature data calculated when there is no influence of shadows or shininess. The relative feature data is a value obtained by dividing the difference between first feature data 2001 and second feature data 2002 by the difference between third feature data 2003 and the second feature data 2002.

The right part of FIG. 20 illustrates an example of relative feature data calculated when there is an influence of shadows or shininess. In this case, feature data 2004 resulting from the influence of shadows or shininess is added to each of a luminance gradient of first regions, a luminance gradient of second regions, and a luminance gradient of third regions. In addition, the luminance gradients corresponding to the first feature data 2001, the second feature data 2002, and the third feature data 2003 change to feature data 2001-2, feature data 2002-2, and feature data 2003-2 whose strengths are multiplied by "a" due to the influence of shadows or shininess. Note that when contrast decreases, "a" is a value less than one. When contrast increases, "a" is a value greater than one.

In the example of FIG. 20, differences in luminance gradient between two regions among three regions are taken, and the ratio between the plurality of differences obtained for two regions of different combinations is used as relative feature data. By this, the feature data 2004 resulting from the influence of shadows or shininess is cancelled out, and the influence of "a" corresponding to the amount of change in contrast is also cancelled out. As a result, the same relative feature data is calculated in the left and right parts of FIG. 20.

As such, the image processing apparatus according to the present embodiment calculates feature data that is not influenced by illumination such as shadows and shininess, using a relative relationship between a plurality of feature data calculated from a plurality of regions with different positions or different sizes. By this, high-accuracy image recognition (object recognition) which is also robust against illumination changes, etc., becomes possible.

Figure 21:
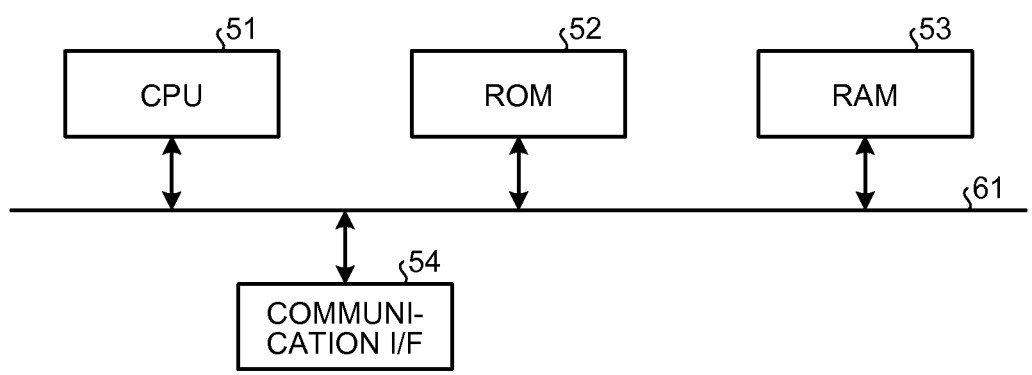
FIG. 21 is a hardware configuration diagram of an image processing apparatus according to the present embodiment.

Next, a hardware configuration of the image processing apparatus according to the present embodiment will be described using FIG. 21. FIG. 21 is an illustrative diagram illustrating a hardware configuration of the image processing apparatus according to the present embodiment.

The image processing apparatus according to the present embodiment includes a control apparatus such as a CPU (Central Processing Unit) 51, storage apparatuses such as a ROM (Read Only Memory) 52 and a RAM (Random Access Memory) 53, a communication I/F 54 that performs communication by connecting to a network, and a bus 61 that connects the above-described components.

A program executed by the image processing apparatus according to the present embodiment is provided preinstalled in the ROM 52, etc.

The program executed by the image processing apparatus according to the present embodiment may be configured to be provided as a computer program product by recording the program in a computer-readable recording medium, such as a CD-ROM (Compact Disk Read Only Memory), a flexible disk (FD), a CD-R (Compact Disk Recordable), or a DVD (Digital Versatile Disk), in an installable or executable format file.

Furthermore, the program executed by the image processing apparatus according to the present embodiment may be configured to be provided by storing the program on a computer connected to a network such as the Internet, and downloading the program via the network. Alternatively, the program executed by the image processing apparatus according to the present embodiment may be configured to be provided or distributed via a network such as the Internet.

The program executed by the image processing apparatus according to the present embodiment can cause a computer to function as the above-described units of the image processing apparatus (the obtainer, the setter, the first calculator, the second calculator, the third calculator, and the detector). In the computer, the CPU 51 can read the program from a computer-readable storage medium into a main storage apparatus and execute the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a processor configured to operate as at least:
an obtainer to obtain an image;
a setter to set a plurality of first regions and a plurality of second regions on the image, each of the first regions and the second regions including two or more pixels, and at least one of the second regions being different in position or size from the first regions;
a first calculator to calculate first feature data representing an image feature of the first regions;
a second calculator to calculate second feature data which is a luminance gradient between the second regions;
a third calculator to calculate relative feature data representing a relative relationship between the first feature data and the second feature data, the relative feature data being a difference between the first feature data and the second feature data;
a detector to detect, based on the calculated relative feature data, an object in the image; and
an output generator to generate an output based on a detected object.

2. The apparatus according to claim 1, wherein the setter sets the first regions and the second regions on the image such that the first regions and the second regions are arranged on a circumference of a same circle.

3. The apparatus according to claim 1, wherein the setter sets the first regions and the second regions on the image such that the first regions and the second regions are arranged on circumferences of two concentric circles, respectively.

4. The apparatus according to claim 1, wherein the setter sets the first regions and the second regions on the image such that the first regions and the second regions are arranged on a perimeter of a same rectangle.

5. The apparatus according to claim 1, wherein the setter sets the first regions and the second regions on the image, the second regions having a same center as the first regions and being different in size from the first regions.

6. The apparatus according to claim 1, wherein the first feature data is a luminance gradient between the plurality of first regions.

7. An image processing apparatus comprising:
a processor configured to operate as at least:
an obtainer to obtain an image;
a setter to set a plurality of first regions and a plurality of second regions on the image, each of the first regions and the second regions including two or more pixels, and at least one of the second regions being different in position or size from the first regions;
a first calculator to calculate first feature data representing an image feature of the first regions;
a second calculator to calculate second feature data which is a luminance gradient between the second regions;
a third calculator to calculate relative feature data representing a relative relationship between the first feature data and the second feature data, the relative feature data being a ratio between the first feature data and the second feature data;
a detector to detect, based on the calculated relative feature data, an object in the image; and
an output generator to generate an output based on a detected object.

8. An image processing apparatus comprising:
a processor configured to operate as at least:
an obtainer to obtain an image;
a setter to set a plurality of first regions and a plurality of second regions on the image, each of the first regions and the second regions including two or more pixels, and at least one of the second regions being different in position or size from the first regions;
a first calculator to calculate first feature data representing an image feature of the first regions;
a second calculator to calculate second feature data which is a luminance gradient between the second regions;

a third calculator to calculate relative feature data representing a relative relationship between the first feature data and the second feature data;
a detector to detect, based on the calculated relative feature data, an object in the image; and
an output generator to generate an output based on a detected object, wherein
the setter further sets a plurality of third regions on the image, each of the third regions including two or more pixels, and at least one of the third regions being different in position or size from the first regions and the second regions,
the second calculator further calculates third feature data representing an image feature of the third regions, and
the third calculator calculates relative feature data representing a relative relationship between the first feature data, the second feature data, and the third feature data, the relative feature data being a ratio between a difference between the first feature data and the second feature data, and a difference between the third feature data and the second feature data.

9. An image processing method comprising:
obtaining an image;
setting a plurality of first regions and a plurality of second regions on the image, each of the first regions and the second regions including two or more pixels, and at least one of the second regions being different in position or size from the first regions;
calculating first feature data representing an image feature of the first regions;
calculating second feature data, the second feature data being a luminance gradient between the second regions;
calculating relative feature data representing a relative relationship between the first feature data and the second feature data, the relative feature data being a difference between the first feature data and the second feature data;
detecting, based on the calculated relative feature data, an object in the image; and
generating an output based on a detected object.

10. A computer program product comprising a non-transitory computer-readable medium containing an image processing program, the program, when executed, causing a computer to execute at least:
obtaining an image;
setting a plurality of first regions and a plurality of second regions on the image, each of the first regions and the second regions including two or more pixels, and at least one of the second regions being different in position or size from the first regions;
calculating first feature data representing an image feature of the first regions;
calculating second feature data, the second feature data being a luminance gradient between the second regions;
calculating relative feature data representing a relative relationship between the first feature data and the second feature data, the relative feature data being a difference between the first feature data and the second feature data;
detecting, based on the calculated relative feature data, an object in the image; and
generating an output based on a detected object.

11. An image processing method comprising:
obtaining an image;
setting a plurality of first regions and a plurality of second regions on the image, each of the first regions and the second regions including two or more pixels, and at least one of the second regions being different in position or size from the first regions;
calculating first feature data representing an image feature of the first regions;
calculating second feature data, the second feature data being a luminance gradient between the second regions;
calculating relative feature data representing a relative relationship between the first feature data and the second feature data, the relative feature data being a ratio between the first feature data and the second feature data;
detecting, based on the calculated relative feature data, an object in the image; and
generating an output based on a detected object.

12. An image processing method comprising:
obtaining an image;
setting a plurality of first regions and a plurality of second regions on the image, each of the first regions and the second regions including two or more pixels, and at least one of the second regions being different in position or size from the first regions;
calculating first feature data representing an image feature of the first regions;
calculating second feature data, the second feature data being a luminance gradient between the second regions;
calculating relative feature data representing a relative relationship between the first feature data and the second feature data;
setting a plurality of third regions on the image, each of the third regions including two or more pixels, and at least one of the third regions being different in position or size from the first regions and the second regions;
calculating third feature data representing an image feature of the third regions;
calculating relative feature data representing a relative relationship between the first feature data, the second feature data, and the third feature data, the relative feature data being a ratio between a difference between the first feature data and the second feature data, and a difference between the third feature data and the second feature data;
detecting, based on the calculated relative feature data, an object in the image; and
generating an output based on a detected object.

13. A computer program product comprising a non-transitory computer-readable medium containing an image processing program, the program, when executed, causing a computer to execute at least:
obtaining an image;
setting a plurality of first regions and a plurality of second regions on the image, each of the first regions and the second regions including two or more pixels, and at least one of the second regions being different in position or size from the first regions;
calculating first feature data representing an image feature of the first regions;
calculating second feature data, the second feature data being a luminance gradient between the second regions;
calculating relative feature data representing a relative relationship between the first feature data and the second feature data, the relative feature data being a ratio between the first feature data and the second feature data;
detecting, based on the calculated relative feature data, an object in the image; and
generating an output based on a detected object.

14. A computer program product comprising a non-transitory computer-readable medium containing an image processing program, the program, when executed, causing a computer to execute at least:

obtaining an image;

setting a plurality of first regions and a plurality of second regions on the image, each of the first regions and the second regions including two or more pixels, and at least one of the second regions being different in position or size from the first regions;

calculating first feature data representing an image feature of the first regions;

calculating second feature data, the second feature data being a luminance gradient between the second regions;

calculating relative feature data representing a relative relationship between the first feature data and the second feature data;

setting a plurality of third regions on the image, each of the third regions including two or more pixels, and at least one of the third regions being different in position or size from the first regions and the second regions;

calculating third feature data representing an image feature of the third regions;

calculating relative feature data representing a relative relationship between the first feature data, the second feature data, and the third feature data, the relative feature data being a ratio between a difference between the first feature data and the second feature data, and a difference between the third feature data and the second feature data;

detecting, based on the calculated relative feature data, an object in the image; and generating an output based on a detected object.

* * * * *